United States Patent [19]

Lee

[11] Patent Number: 4,924,342

[45] Date of Patent: May 8, 1990

[54] LOW VOLTAGE TRANSIENT CURRENT LIMITING CIRCUIT

[75] Inventor: Robert H. Lee, Fullerton, Calif.

[73] Assignee: Teledyne Inet, Torrance, Calif.

[21] Appl. No.: 228,829

[22] Filed: Aug. 3, 1988

Related U.S. Application Data

[63] Continuation-in-part of Ser. No. 6,798, Jan. 27, 1987, abandoned.

[51] Int. Cl.⁵ .............................................. H02H 9/02
[52] U.S. Cl. .......................................... 361/58; 361/42
[58] Field of Search ................ 361/20, 21, 22, 42–50, 361/58, 111, 114, 115, 117, 91, 87

[56] References Cited

U.S. PATENT DOCUMENTS

| | | |
|---|---|---|
| 3,256,448 | 6/1966 | Ogawa et al. ............... 361/58 |
| 3,558,983 | 1/1971 | Steen ........................... 361/58 |
| 3,611,031 | 10/1971 | Lutz ......................... 361/58 X |
| 4,042,963 | 8/1977 | Kriechbaum .............. 361/20 |
| 4,122,507 | 10/1978 | Queen ..................... 361/58 X |
| 4,158,864 | 6/1979 | Kennon ....................... 361/58 |
| 4,184,186 | 1/1980 | Barkan .................... 361/58 X |
| 4,214,289 | 7/1980 | Otsuka et al. .......... 361/58 X |
| 4,236,186 | 11/1980 | Takagi ..................... 361/58 X |
| 4,266,258 | 5/1981 | Eidinger et al. ......... 361/58 |

Primary Examiner—A. D. Pellinen
Assistant Examiner—A. Jonathan Wysocki
Attorney, Agent, or Firm—Monty Koslover Assoc.

[57] ABSTRACT

A polyphase AC current limiting circuit, which incorporates improvements in control methods and circuitry that operate to avoid high rates of current change which occur upon initiation of a branch load fault and when the branch load fault is suddenly cleared. This "soft" start and "soft" load-off characteristic, reduces the voltage transients imposed on the AC power source and bus to relative insignificance compared with the voltage transients imposed by prior art current limiting circuits. The invention AC current limiting circuit comprises a high impedance circuit connected in parallel with a low impedance circuit, a load-off circuit connected in shunt with the device output power lines, and a control means for controlling the switching devices. When a branch load fault is sensed, the control means turns off the switches in the low impedance circuit through which normal current flows, and turns on the switches in the high impedance circuit, starting phased back, so that the initial current step is typically 100 percent of rated load current. Within a few cycles, the switches are phased to full on and the maximum current is limited by an inductor in series with the switches in the high impedance circuit. When the load fault is suddenly cleared and current drops to zero, the load-off circuit is energized and current continues to flow at graduated lower levels until the circuit is switched off. In the event that the load fault does not clear, the switches in the high impedance circuit are turned off, stopping current flow and a trip signal is transmitted to trip open an external input circuit breaker.

7 Claims, 4 Drawing Sheets

LOW VOLTAGE TRANSIENT CURRENT LIMITING CIRCUIT

This application is a continuation-in-part of application Ser. No. 07/006,798 filed 01/27/87, abandoned.

BACKGROUND OF THE INVENTION

1. Field of the Invention

This invention relates to an improvement in apparatus for limiting the current drawn by a faulted load that is connected to an AC power bus, and more particularly to methods of reducing the voltage transients imposed on an electric power generator source or AC bus by a faulted load.

2. Description of the Prior Art

Power converters such as Engine Generator Sets, Motor Generator Sets, Solid State Power Converters and the like, usually have limited capacity to supply current into a load fault. On the occurrence of a fault or short circuit in the load, the output voltage will dip severely, until fault clearing circuit breakers or fuses open the faulted load line. If a number of devices are being powered from the same source, all of the devices are subjected to the extreme voltage dip or transient. Computer equipment is commonly supplied with 400 Hz power from a Solid State Power Converter or a Motor Generator Set. When parallel redundant computer devices are supplied from a common bus, a large voltage transient on the bus caused by a faulted device, can disrupt operation of the entire system, and can not be tolerated. Examples are the computers that support airline reservation systems, or support tellers in banks. When such a system suffers a power interruption for only a short time, it may be hours before the entire system can be returned to full function.

For this reason, it has been the practice to provide current limiting circuits in series with individual branch loads. In this manner, fault current can be limited to a value such that the voltage transients which are caused by a fault in a given branch load, are limited to a value that does not disrupt function of loads other than the one in which the fault occurred.

Over the past twenty years, several types of current limit devices have been developed and used. These devices operate normally in a low impedance mode, and change to a high impedance mode when a fault current is sensed. In the devices, the value of the total impedance in the high impedance mode must be set to limit the fault current. When operating in the low impedance mode, the normal AC current flows in a circuit that may include an inductor in series with a capacitor tuned to the load operating frequency, or it may instead include a series switch. Both circuits present a negligible impedance to the flow of current. When operating in the high impedance mode, the fault current flows in a bypass circuit which may include a series reactor and resistor, or a saturable reactor. The bypass circuit components must be selected and set to limit the fault current.

Examples of prior art current limiting devices are U.S. Pat. No. 3,558,983, by Steen and U.S. Pat. No. 4,158,864 by Kennon. In the Steen embodiment, the low impedance circuit comprises, in each phase, two thyristors in inverse parallel relationship (back-to-back) each in series with a commutation inductor. The high impedance circuit comprises two thyristors in inverse parallel relationship, in series with a resistor. The resistor is set to limit current to a given value. When an overcurrent condition is detected, the thyristors in the low impedance circuit are commutated off and the thyristors in the high impedance circuit are gated on. Fault current then flows in the high impedance circuit. The fault current rate of rise di/dt is not restricted and depends on the value of the inserted resistor. If the faulted load circuit breaker does not trip after a predetermined time or the load fault is not removed, a signal is sent by controls to trip a circuit breaker, disconnecting the faulted load.

In the Kennon embodiment, a pair of series connected resonant branch circuits are utilized. Normal AC current flows in a circuit including an inductor in series with a capacitor and tuned to the load operating frequency. Upon detection of a fault, a switch is opened, the normal current circuit is detuned and current flows through a parallel high impedance path. As in Steen, the fault current rate of rise di/dt is not restricted in any way, since the high impedance is inserted abruptly and the impedance value is selected to permit the highest specified "let-through" current. Furthermore, in both Steen and Kennon, neither is any provision made to soften or counter the voltage rise that will occur when the load circuit breaker trips open and the short circuit current vanishes.

In general, both the Steen and Kennon devices appear well suited as protective devices for limiting a temporary overload condition of 125 or 135 percent of rated current. Their application to short-circuit conditions is another matter. Short-circuit conditions may be as high as 200 or 300 percent of rated current. The current limiting device would then be required to permit up to 200 or 300 percent of rated current to flow for a predetermined time, typically 1 second. For example, the military specification SHIPS-D-5977 requires current limiting devices to limit at 240 percent of rated current for 750 milliseconds. Thus for the Steen and Kennon devices, switching to the high impedance mode could result in an initial current as high as 240 percent of rated, producing steep transient voltage dips in the AC power bus voltage. This would make them unsuitable for the application. Thus, there exists a need for a device that will not only limit the let-through current, but will produce a soft start and a soft load-off condition for the current limiting device high impedance operation, so that resulting AC bus voltage transients are negligible.

SUMMARY OF THE INVENTION

The invention comprises improvements in the circuitry of a polyphase AC current limiting device and methods of controlling the device, such that high rates of current change due to device operation in the high impedance are avoided. In accordance with the invention, the circuit restricts the initial rate of rise of the fault current to an acceptably low value, immediately following the application of a short circuit at the load. In normal operation, the current flows through a static switch to the load and impedance to current flow is low. When a short circuit occurs in the load, current transformers in each load line signal the rapid rise in current and the control responds by opening the closed static switch. AC current then flows through a bypass high impedance circuit which includes SCR's phase controlled on current magnitude, and a current limiting reactor. The phase control circuit is started with a phase angle that limits the let through current through the SCR to a preset maximum value. The SCR phase control is then opened over a short time period of a number of cycles to a full on status. Thus the current amplitude is gradually ramped upwards. Thereafter, the current is limited by the value of the Inductor to a preset maximum value of fault current. This value of current is sufficiently low as to be within the current supply capacity of the power source. By this sequence of control, the voltage transient in response to a short circuit in the load, can be made arbitrarily small and insignificant. If the fault does not clear in a predetermined time interval, the SCR circuit is switched off, thereby terminating current flow to the fault. In the event that the high impedance circuit fails to open, the control circuit will be caused to trip the input circuit breaker.

If the fault in the load clears, this can cause an abrupt interruption of current and thereby cause a severe voltage transient as the current step changes from a high value to a much lower value.

To minimize the effect of fault termination, a three phase bridge circuit of thristors (SCR's) is connected through reactors to the output of the current limiting device. On detecting an abrupt drop in current flow, the controller switches the three phase bridge circuit on, thereby immediately reloading the power source to a preset maximum value. The three phase bridge circuit is then rapidly phase controlled to zero current and turned off. Thereby the load-off transient is made arbitrarily small and insignificant.

Accordingly it is an object of the present invention to provide novel apparatus and a method for limiting the rate of rise of load current into a fault to a value that will cause only low or negligible voltage transients on the AC power bus. It is a further object of the invention to prevent severe load-off voltage transients by means of a control on the rate that load current can be diminished, and thereby to allow only low or negligible load-off voltage transients when a load fault is cleared. It is another object of this invention to provide a device wherein the magnitude of maximum current flow in a circuit can be selected to an arbitrary maximum value, that is independent of load faults and of circuit impedance characteristics.

Further objects and advantages will become apparent from a study of the following portion of the specification, the claims and the attached drawings.

DETAILED DESCRIPTION OF THE INVENTION

Figure 1:
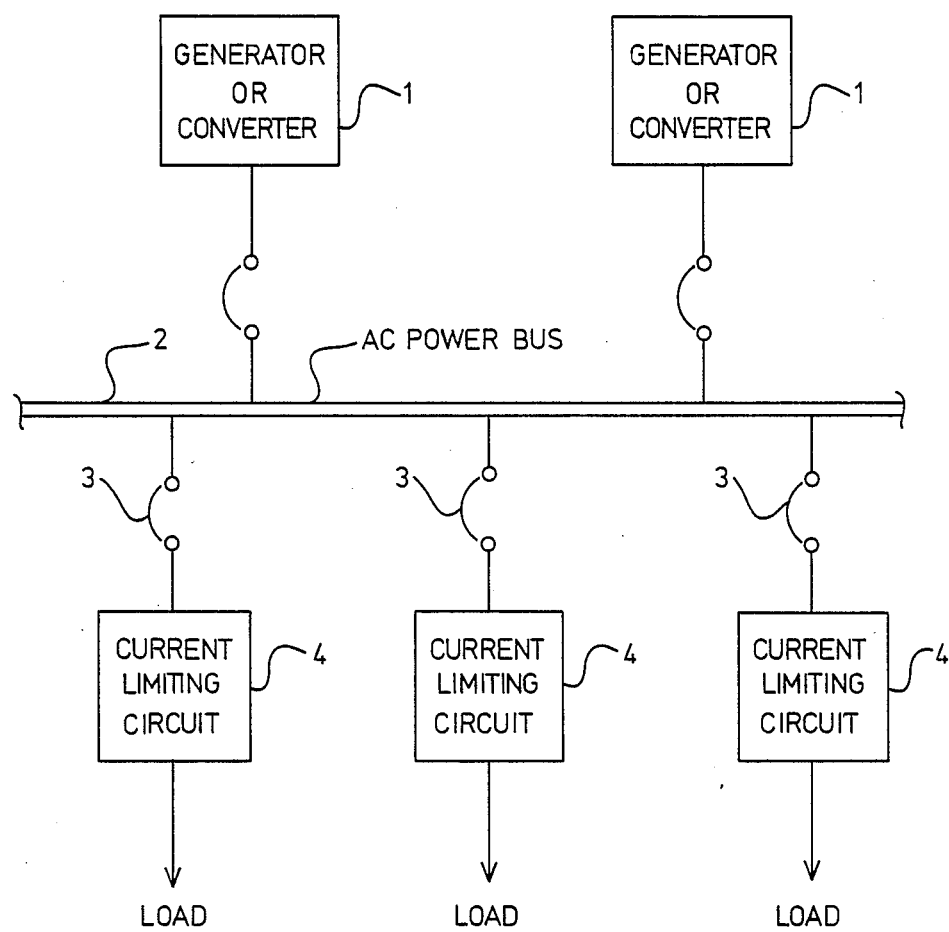
FIG. 1 is a single line block diagram, showing the application of the present invention current limiting circuit in branches of a typical AC load bus configuration.

Referring initially to FIG. 1, there is shown a typical AC system application of the invention. In the example, two electric power generators or static power converters 1, supply AC electric power to a power bus 2. Three load branches, each having a circuit breaker 3 and a low voltage transient current limiting circuit 4 in series with the load, are connected to the power bus 2. The system depicted is for polyphase AC power, however, a single line diagram is shown for simplicity. In normal operation, power flows from the power bus 2 to each load branch through closed circuit breakers 3 and current limiting circuits 4 to the loads. In the event of a fault occurring at any of the loads, its current limiting circuit 4 will limit the fault current to an acceptable value. After a short time interval, if the fault does not clear, a control in the current limiting circuit 4 will cause the branch circuit breaker 3 to trip open, isolating the faulted branch from the AC power bus.

In the standard or prior art current limiting devices, no provision is made for restricting the initial current rate of rise di/dt when the high impedance circuit is switched in. Neither is any provision made for preventing a sharp drop in current to zero when the breaker for the faulted load trips open. It is the intention of this specification to describe these provisions as improvements to the standard current limiting devices. The invention improvements are now described by the drawings and specification, both as to circuitry and control method.

Figure 2:
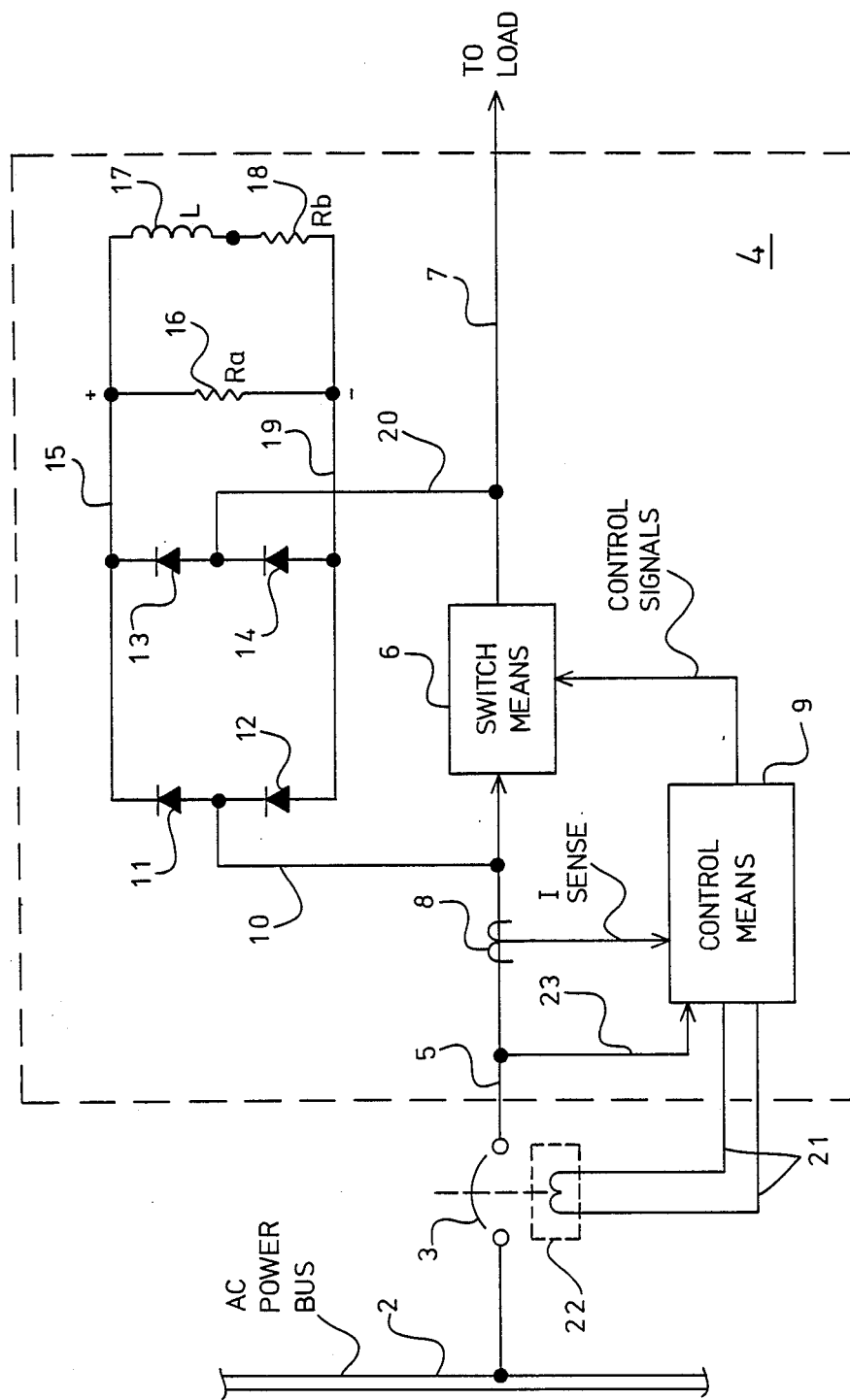
FIG. 2 is a simplified schematic diagram of a first presently preferred embodiment of a three phase current limiting circuit, in accordance with the principles of the present invention.

Refer now to FIG. 2 illustrating the first preferred embodiment of a three-phase low voltage transient current limiting circuit for the present invention. In normal continuous mode operation, the flow of Phase A current to the load may be traced from the AC Power Source, 2 through the three phase circuit breaker 3, through the power line 5, and through the low impedance circuit Gate-Turn-Off GTO thyristors 13 and 14, and through the power connection 7 to the load. Phase B and Phase C load currents follow corresponding paths. GTOs 13 and 14 are controlled to an "ON" state during all normal operation. The voltage drop across the GTOs is low and the power loss in these devices is correspondingly low. During normal operation, no current is allowed to flow through the high impedance circuit comprised of SCRs 15 and 16 and current limiting reactor L1 17. On occurrence of a short circuit or overload fault in the load circuit, current transformers 9, 10 and 11 signal the control means 12 of the new condition. Within a few microseconds, the control means 12 turns "ON" the GTO drive circuit for GTO's 13 and 14 in Phase A low impedance circuit and the corresponding GTO's in phases B and C. At the same time, the SCR drive circuit for SCR's 15 and 16 in the high impedance circuit and corresponding SCR's in Phases B and C, is switched to "ON". At this time, all high impedance circuit SCR's are phased partially "ON", typically retarded at 105 degrees, so that the current that can flow through the inductor 17 (L1) is limited to a predetermined maximum value. The initial current step is typically selected to be 100 percent of rated load current or less. Depending on the load current prior to the fault, this first current step should produce a rate of rise di/dt of approximately 0.3 A/microsec or less. Within a short time, typically a few cycles, which duration is determined by the power source capacity to rate of change in load, the SCR's are phased to a full "ON" status. Thereafter, current to the fault is limited by the inductor 17 which will have a low power factor, so that "real load" required from the AC power source is limited throughout the duration of the short circuit.

The maximum current after the initiation of the fault and the steady state fault current are independently controllable. The maximum current after fault initiation is controlled by adjusting the SCR drive logic settings so that the initial phase back retardation is set in the range of approximately 85 to 130 degrees. The higher the degree of retardation, the less time the SCR is "ON" and the less current will flow. The maximum steady state fault current is determined by selection of the inductor 17 (L1) to suit the device "let-through" current rating. Thus, a "let-through" current rating of 300 A RMS would require selection of an inductor L1 rated at 300 A RMS.

The rate of current change di/dt between the initial current step and the steady state setting is also arbitrarily controllable. This is done by adjusting the time period taken for changing from the initial SCR phase retardation angle of typically 105 degrees to 0 degrees. The combined effect of producing this relatively gradual change in current amplitude immediately after initiation of a load fault is to "soften" and decrease the voltage transient imposed on the AC source bus. The first improvement control method steps to achieve this result are as follows:

1. Detect an overcurrent condition when sensed load current rises to sharply above a set pickup level.
2. Immediately upon detection, switch off the GTO's in the normal current low impedance circuit.
3. At the same time as Step 2, switch on the SCR's at a preset retarded firing angle in the range of 85 to 130 degrees. The firing angle should be selected and preset to produce a current rate of change of approximately 0.3 A/microsec or less.
4. Gradually change the SCR retarded firing angle to zero degrees over a preset period of time or number of cycles.

Referring again to FIG. 2 sufficient "let-through" fault current is flowing through the high impedance circuit of SCR's 15 and 16 and inductor L1 17, to clear the down line circuit breakers which protect the faulted load. In expected operation, the fault current will suddenly be cleared, and fault current will drop to zero. Only normal load current will now be present. However, in the transition from fault current to normal load current, a severe voltage transient may be caused on the main AC Power Bus. To prevent this occurrence, at the instant that fault current is detected to be removed, the control means 12 switches on the three phase SCR bridge circuit 8 which is connected in sunt with the output power phase lines. This causes current to flow through inductor 18, designated L2 which is connected to the SCR bridge circuit 8 and also through inductors 19 and 20, that are likewise connected. This load substitutes for the fault current. The SCR bridge circuit 8 is then phased back rapidly to zero current and switched to "OFF". This action has the effect of limiting the rate of change in current when the fault current is removed. Thereby the voltage transient caused by fault clearing is limited to an arbitrarily low value.

In the event that fault current does not cause a circuit breaker in the load to open after a preset maximum time interval, the SCR's 15 and 16 in Phase A high impedance circuit and the corresponding SCR's in the Phase B and C high impedance circuits are switched to "OFF" by natural commutation. If the SCR's do not turn "OFF" due to a failure in their control, a back up control circuit in the control means 12 will output a trip signal 12a to activate the shunt trip coil 12b circuit breaker 3 to disconnect the circuit branch. These are "emergency events" which are quite unlikely to occur. However, provision must be made to protect against their occurrence because the inductor L1 is designed for short time operation only. Thus it is essential that when this component attains its maximum design temperature, current flow through it must be terminated.

Figure 3:
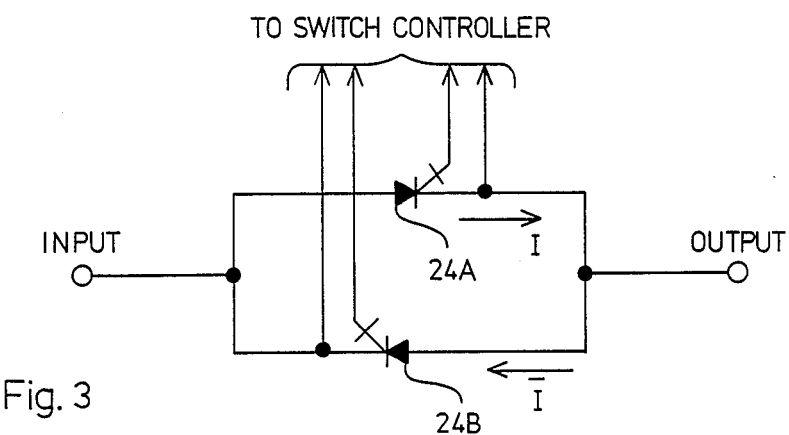
FIG. 3 is a simplified schematic diagram of another presently preferred embodiment of a three phase current limiting circuit, in accordance with the principles of the present invention.
Figure 4A:
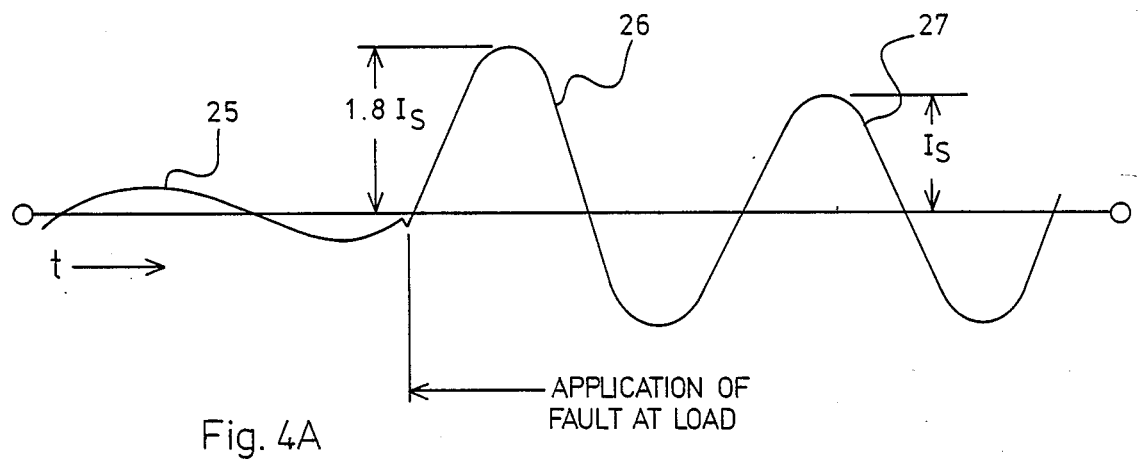
FIG. 4 is a combination circuit and block diagram illustrating the circuitry and control function components comprising the control means for the current limiting circuit of the present invention.
Figure 4B:
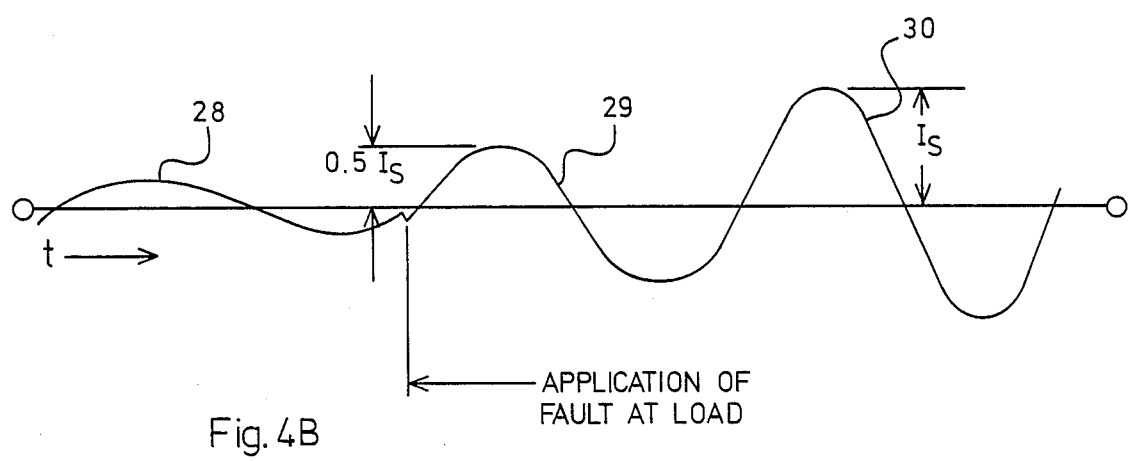

Refer now to FIG. 3 which illustrated another preferred embodiment of a three-phase low voltage transient current limiting circuit for the present invention. All components and circuitry are identical to the first preferred embodiment shown in FIG. 2, except that the inductors are deleted from lines 18, 19 and 20 connecting to the SCR bridge circuit 8, and a loading resistor 22 is added and connected across the SCR bridge circuit. Operation of the device is identical in every instance to that described previously for the first preferred embodiment. The difference in effect however, is that when the fault current suddenly drops to zero, the substituted load represented by the resistor 22 will be resistive rather than inductive as before. This may be desirable for some device applications.

The second improvement control method steps that were described to achieve a "soft" turn-off when fault current is removed are then as follows:

1. Detect when fault current is suddenly removed.
2. Immediately upon detection, switch on the SCR's in the SCR bridge circuit at full "ON", allowing current to continue flowing through the SCR bridge circuit and connected load dissipating elements at about 40 to 50 percent of the maximum fault current level.
3. Phase back the SCR bridge firing angle by retarding to 180 degrees in a few cycles, resulting in zero current flow.

This method allows the load current to decrease gradually, decreasing the voltage transient imposed on the AC source bus by dropping of the load.

The third improvement control method to protect the current limiting circuit components from destruction by over-heating is first to switch off the SCR's in the high impedance circuits after a preset maximum time interval, and second to activate the shunt trip circuit of the branch circuit breaker 3 upstream of the current limiting circuit, and tripping the breaker open.

Figure 4:
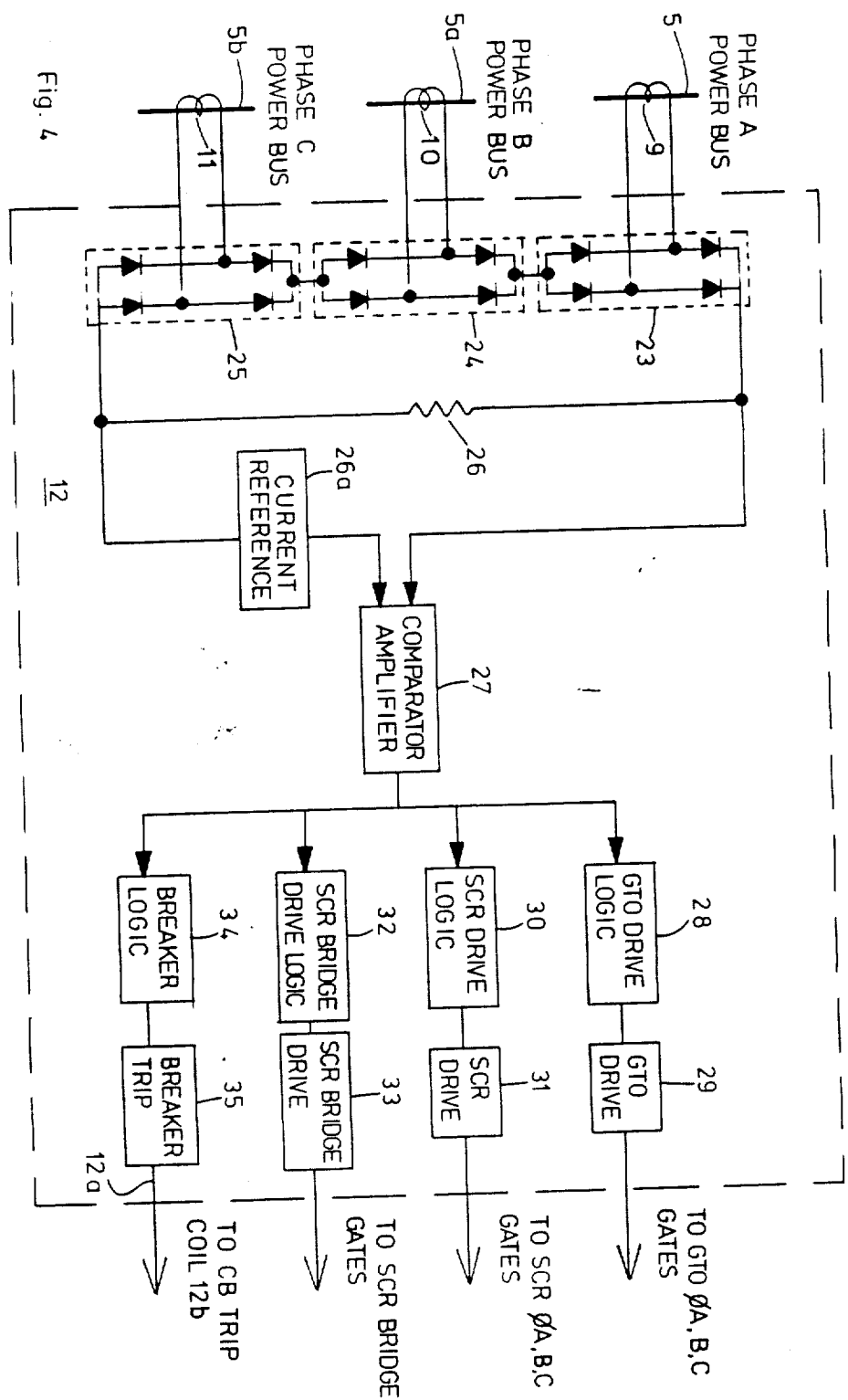
Figure 5:
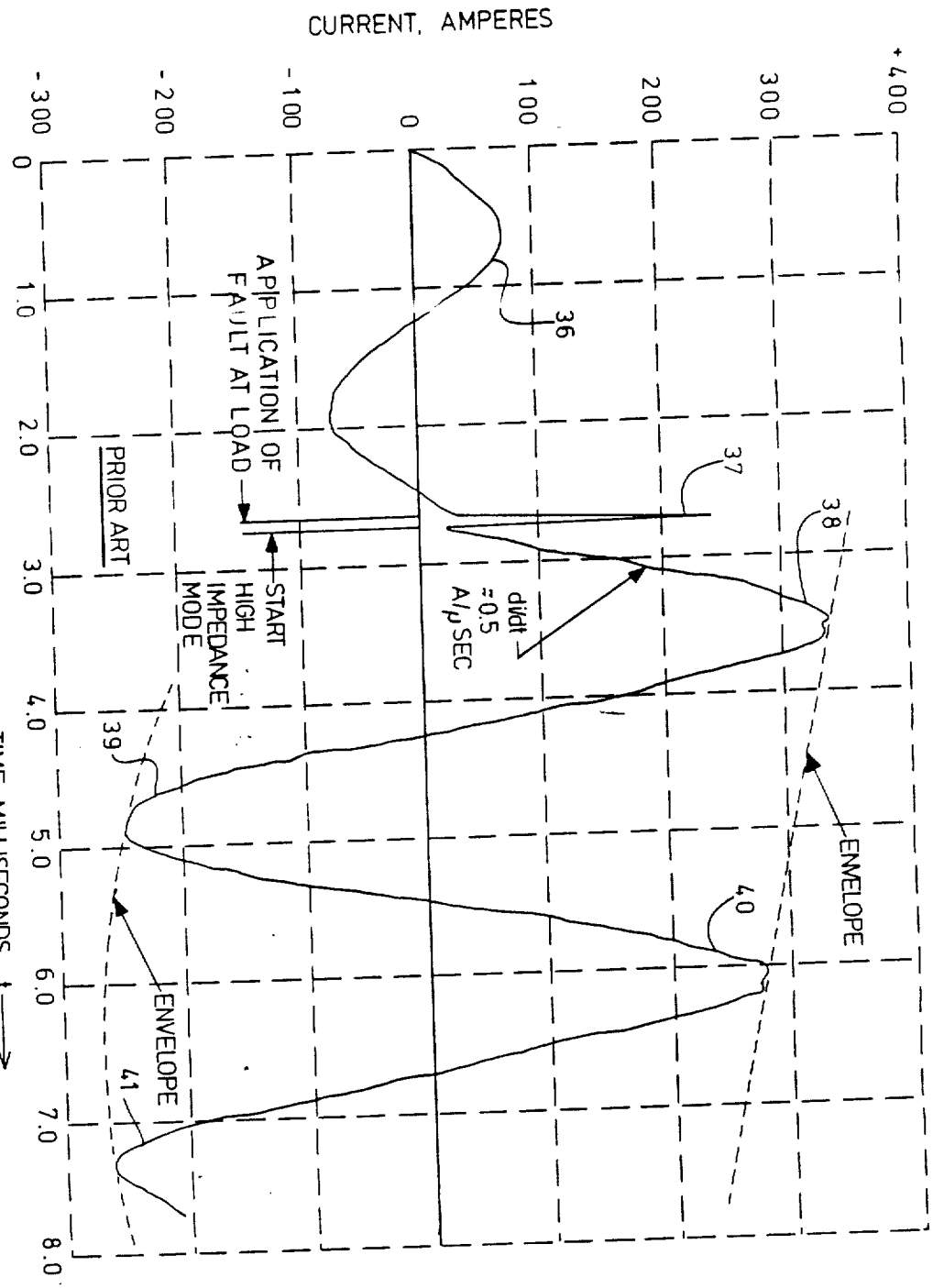

Refer to FIG. 4 which is a combination circuit and block diagram illustrating the functional blocks of the control means 12. Current transformers 9, 10 and 11 each connect to the AC terminals of logic rectifier bridges 23, 24 and 25. The rectifier bridges in the series connection illustrated always output the highest instantaneous current of any individual current transformer. Thus the highest fault current in any one phase is passed through the loading resistor 26. The voltage across resistor 26 is proportional then to the maximum current in any one of the three phases. This maximum value is continuously compared to a current reference 26a which is actually an adjustable voltage source. The comparator-amplifier 27 output which will be "High" for an overcurrent condition, is delivered simultaneously to GTO Drive logic 28, to SCR Drive logic 30 for the high inpedance circuit SCR's and to SCR Bridge Drive logic 32. Each of these logic sections are provided with adjustable timing circuits to permit a response based upon receipt of the first "High" status signal. Typically, the GTO circuit through GTO drive 29 will be switched off after the fault has been present for approximately 25 microseconds. This prevents action when the high values of current are of very short duration. The high impedance circuit SCRs are switched "ON" immediately on presence of fault current. However, no current will flow in this path until after the GTO's are switched to "OFF". SCR drive logic 30 initially sets a retarded firing angle for the SCRs in the range of 85 to 130 degrees. A nominal setting is 105 degrees. This will normally produce a first current step equal to 100 percent of rated load current that the load circuit is designed to carry. Thereafter, SCR drive logic 30 gradually changes the SCR retarded firing angle to zero degrees over a preset period to time or number of cycles, so that the load current is phased to its maximum value. When a load fault clears, as may be caused by opening of the load circuit breaker or blowing of fuses, the sudden removal of the output fault from the detection circuit formed by CT's 9, 10, 11, logic rectifier bridges 23, 24, 25, resistor 26, current reference 26a is input to the comparator-amplifier 27 which outputs a "Lo", and instantly triggers SCR bridge drive logic 32 to switch the drive to "ON". This activation signal causes SCR bridge drive 33 to gate all six SCRs in SCR bridge circuit 8 fully on. Thereafter, a timing circuit in the SCR bridge drive logic 32 phases back the bridge SCRs firing angle by retarding it until current is reduced to zero, and the bridge SCR's are switched to "OFF".

In the event that the fault current is not removed in a predetermined time interval, the SCR drive logic 30 commands the SCR drive 3 to the high impedance circuit SCRs in series with the current limiting inductor L1 in each phase, to be switched to "OFF". If this does not cause cessation of current flow, after a predetermined time interval, the back-up protection circuit of breaker logic 34 commands the breaker trip circuit 35 to issue a trip signal 12a energizing the input circuit breaker 3 trip circuit 12b, causing circuit breaker 3 to trip open.

Figure 5:
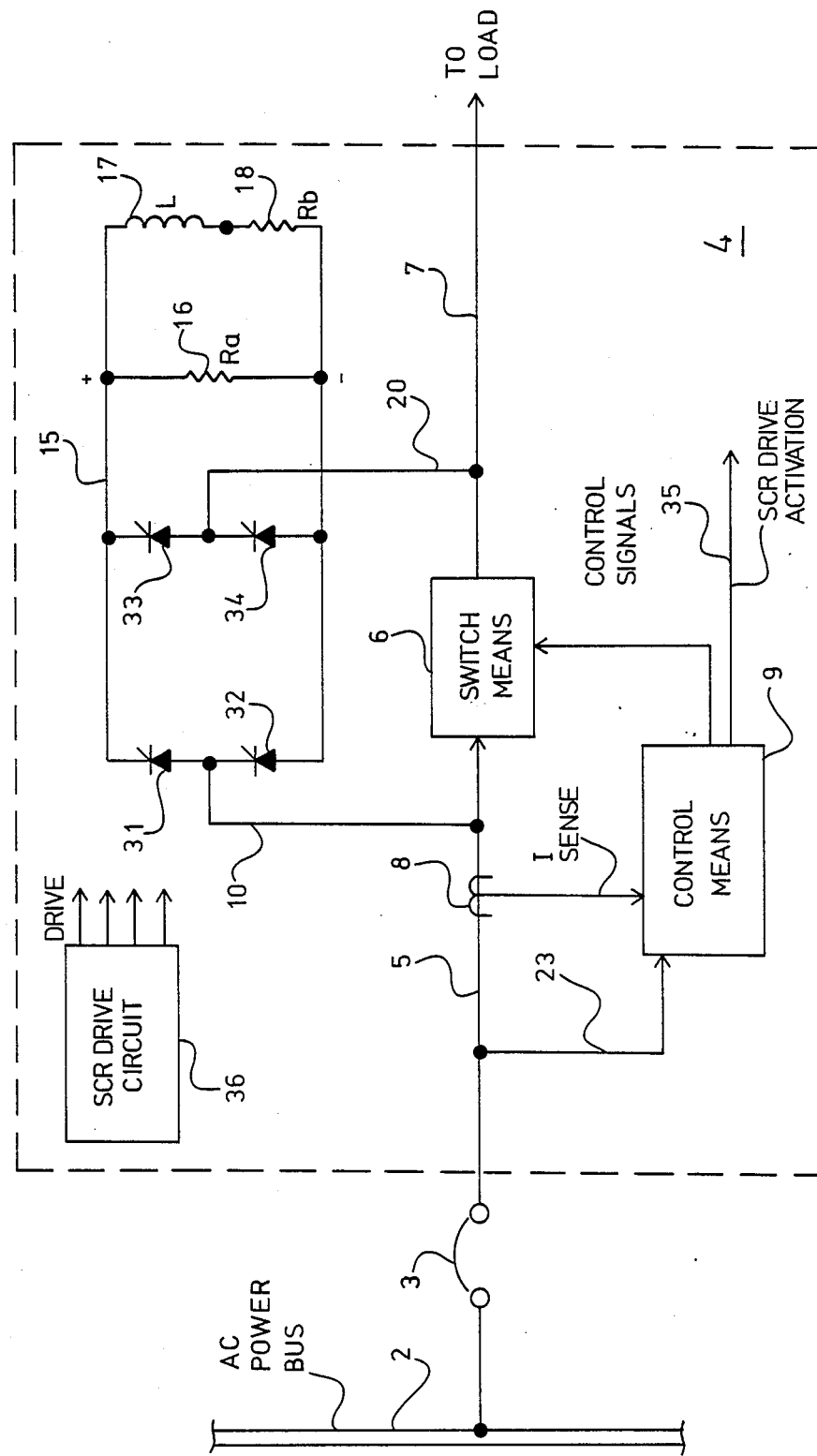
FIG. 5 is a plot of a single phase of output current flowing in a prior art current limiting device, both prior to and immediately after the application of a load fault.
Figure 2:
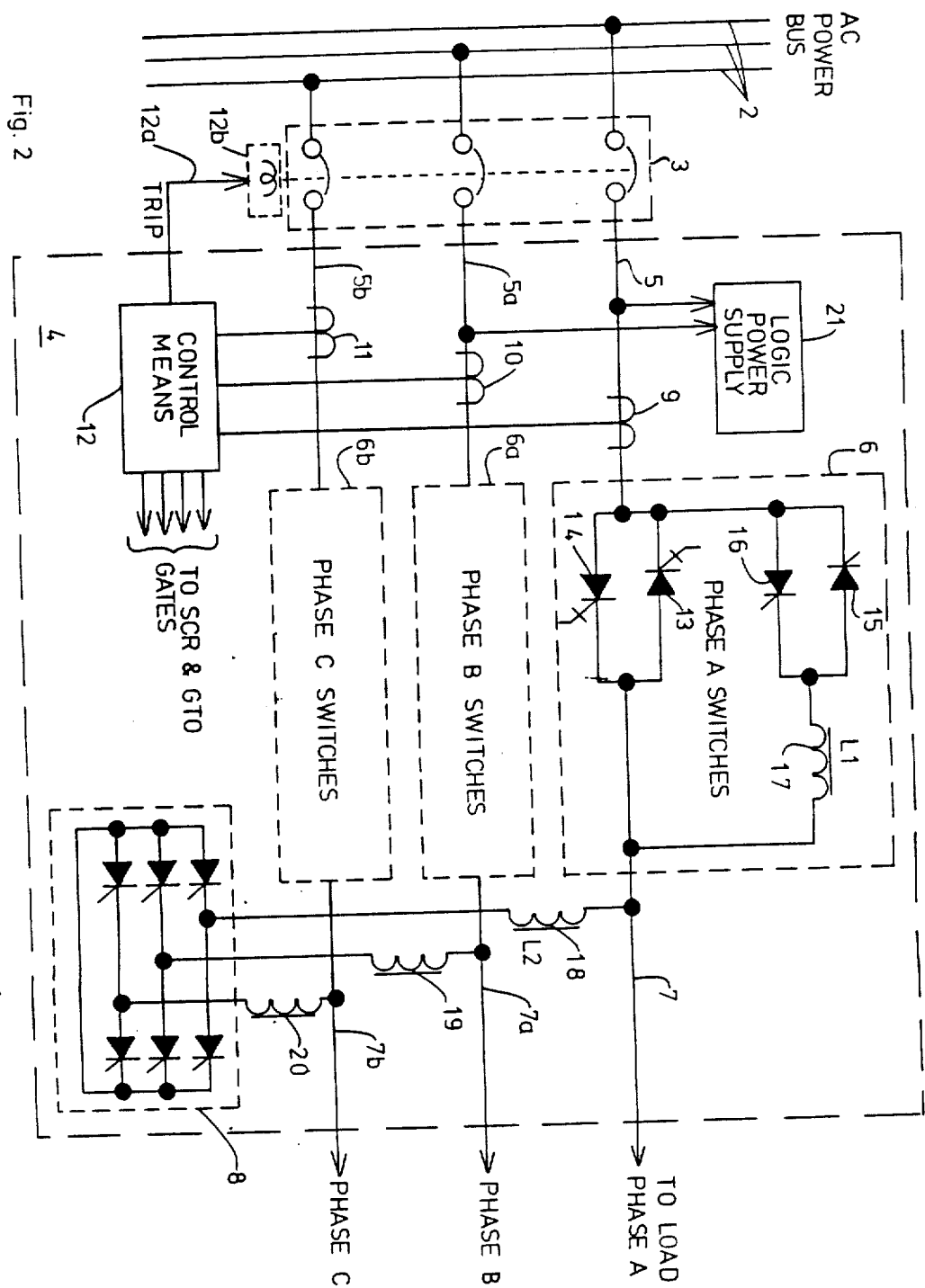
Figure 3:
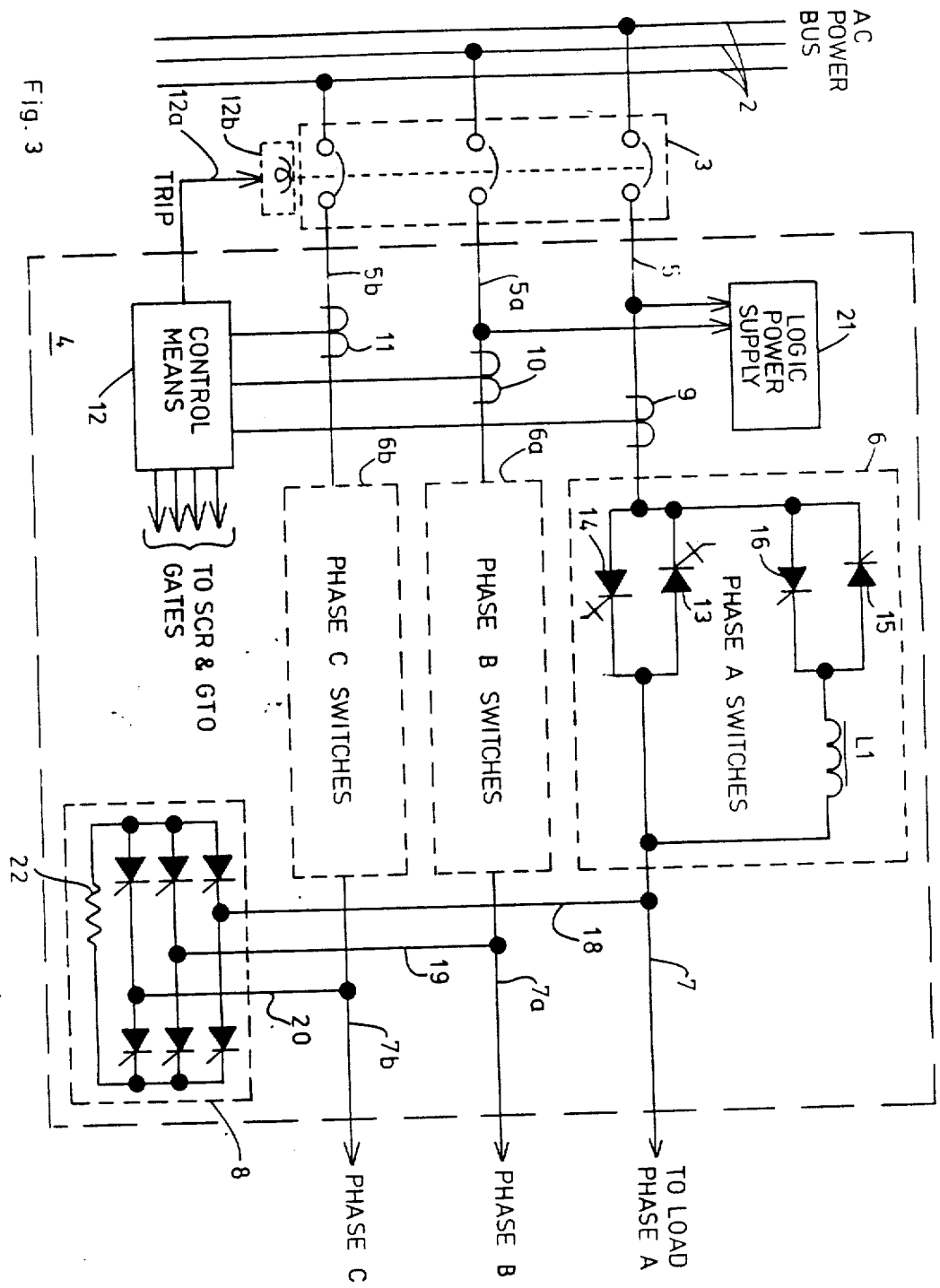

In order to more fully understand the improvements of the instant invention it will be useful to refer to drawings FIGS. 5, 6, 7 and 8a–8d. FIG. 5 is a plot of a single phase (A) of output current flowing in a prior art current limiting device. At point 36, the load current is normal and is approximately 57 A RMS which is 57 percent of the rated load current. At about 2.7 milliseconds from start, a fault is applied at the load, producing a current spike 37. After about 25 microseconds, the device control means switches the high impedance circuit on and the low impedance circuit off. The initial current rises in the first-half cycle 38 to approx. 330 A peak (240 A RMS) and the apparent current rate of change di/dt is approximately 0.5 A/microsecond. In the second half cycle 39 the current decreases and again in the third half cycle 40. Note that the current envelope is asymmetrical due to RC load components. In this plot, the generator frequency was 400 Hz. However, the recorded plot is not expected to change significantly for a different generator frequency such as 60 Hz. The plots of current for the other two Phases B and C should be similar, except for being shifted in time.

Figure 6:
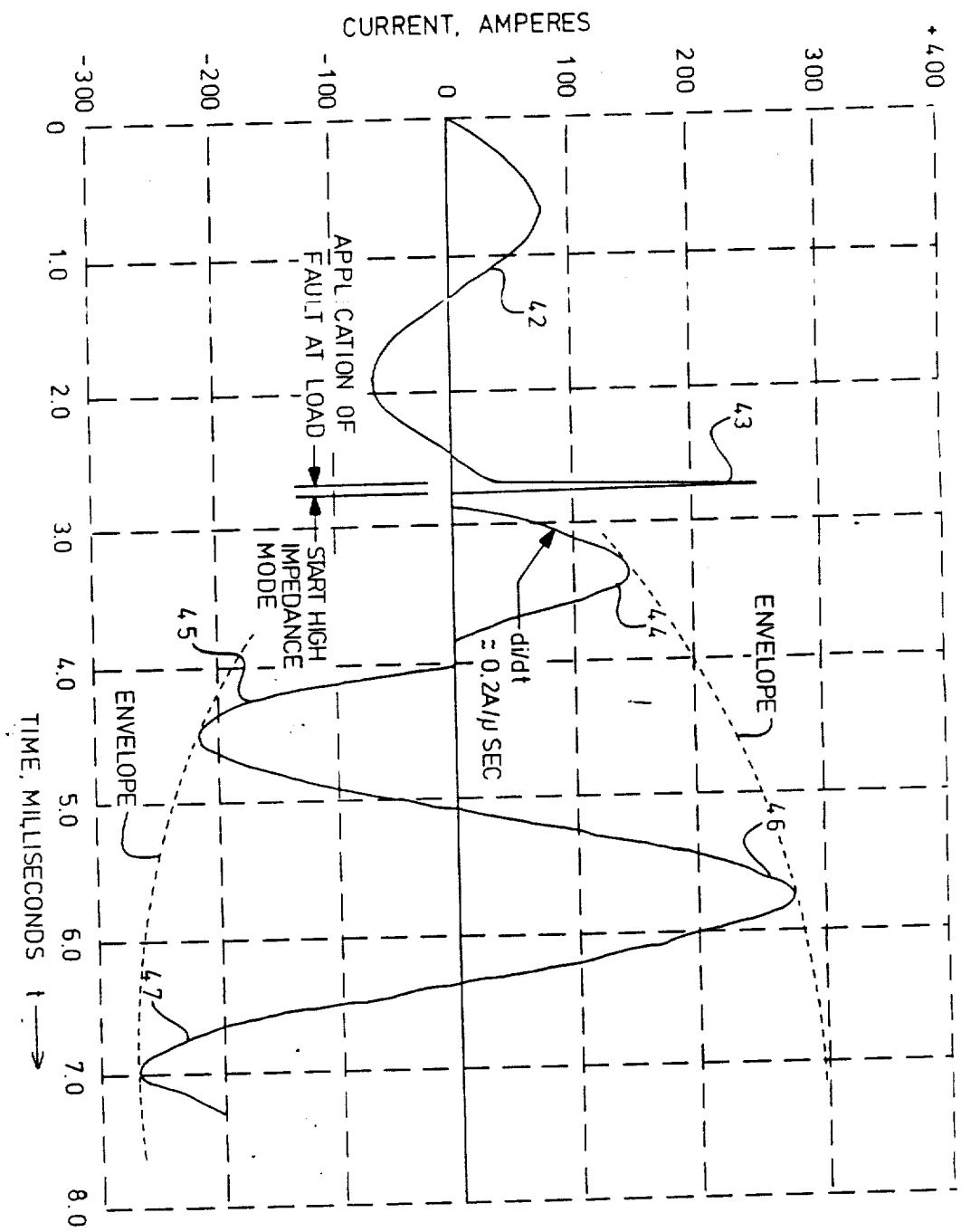
FIG. 6 is a plot of a single phase of output current flowing in a current limiting circuit of the present invention, both prior to and immediately after the application of a load fault; both plots FIG. 5 and FIG. 6 useful for comparison and understanding the improvement in initial current start-up current waveform, resulting from the methods of the pressent invention.

Refer now to FIG. 6 which is a plot of a single phase (A) of output current flowing in a current limiting device of the instant invention. The initial load current at point 42 is approximately 60 A RMS which is 60 percent of the rated load current. At about 2.7 milliseconds from start, a fault is applied at the load, producing a current spike 43. After about 25 microseconds, the invention control means 12 turns off the GTO's in the low impedance circuit and turns on the SCR's in the high impedance circuit. Current then flows through the SCR's with delayed phase to a first half cycle peak 44 of approximately 145 A, corresponding to 103 A RMS which is 103 pof the rated load current. The apparent initial current rate of change di/dt is approximately 0.2 A/microsecond. In the second half cycle the current increases to about 220 A peak and in the third half cycle 46 and fourth half cycle 47, the current increases to approximately 280 A peak or 198 A RMS. This last value is near the maximum fault current rating of the device of 200 A RMS, and is set by the inductor L1. The current envelope is nearly symmetrical and the current increase on each half cycle up to the fourth, is indicative of the change in the SCR retardation angle with time. The generator frequency is 400 Hz and the plot shown is typical performance. It is not expected to change significantly for different generator frequencies.

A comparison of the plots of FIG. 5 for the prior art current limiting device and FIG. 6 for the invention current limiting device, reveals the effect of the first improvement described earlier. Namely, the initial current rise in the instant invention is low and gradual, rising in a few cycles to its maximum. This contrasts with the standard prior art device where the initial current is high and then decreases to its maximum. The sharp current rise of the prior art device would certainly produce a significant voltage transient on the AC power bus, depending on the generator capacity, while the gradual and soft current rise of the instant invention would not do so.

Figure 7:
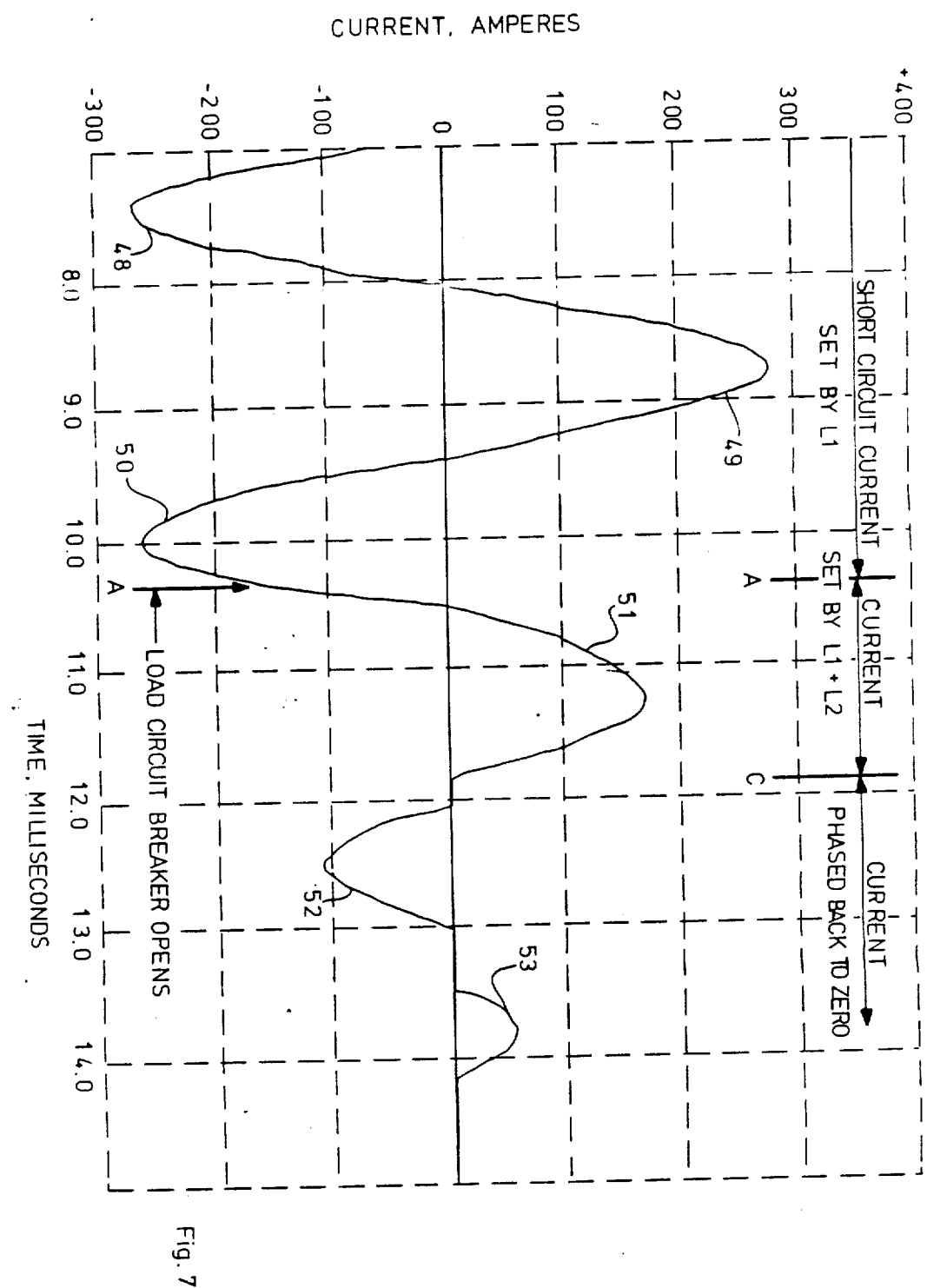
FIG. 7 is a plot of a single phase of output current flowing in the high impedance circuit of the present invention, during a load fault and after the faulted load circuit breaker trips open.

FIGS. 7 and 8a–8d both illustrate current flow in the high impedance circuit of the present invention current limiting circuit, during the short circuit and after the load circuit breaker trips open. FIG. 7 is a plot of the current in a single phase. In the half cycles represented by segments 48, 49 and 50, the short circuit current amplitude is set by inductor L1 and is approximately 198 A RMS. At the time indicated by Point A of approximately 10.3 milliseconds, the load circuit breaker opens. The current flow continues while the circuit breaker arcs, until zero crossover. At this time, the SCR bridge circuit 8 is switched "ON" and current flow is setby inductors L1 and L2 which is connected to the SCR bridge circuit 8. In the first half cycle 51, the current is about 120 A RMS, representing a reduction of approximately 40 percent in the previous current amplitude. The SCR's in the SCR bridge circuit 8 are thereafter phased back, so that in the second half cycle 52 and the third half cycle 53, the current amplitudes are respectively 78 A RMS and 35 A RMS. With each succeeding half cycle, the SCR's are phased back further until the current is reduced to zero and the SCR's are commutated off.

Figure 8A:
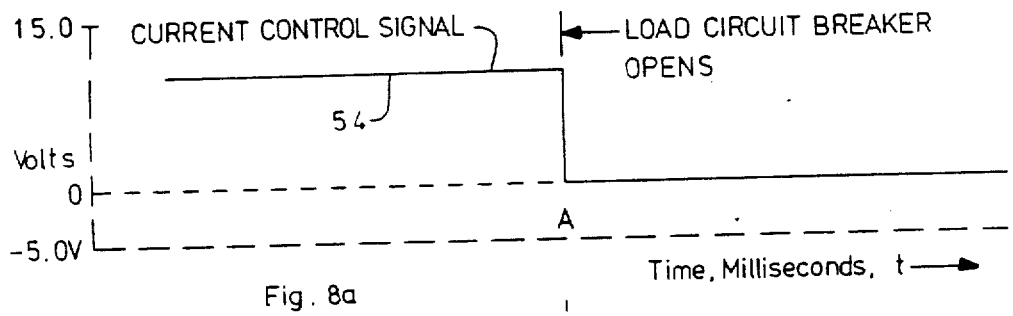
FIGS. 8a–8d are graphs illustrating the sequence of current flow in the high impedance circuit of the present invention, during a load fault and immediately after the faulted load circuit breaker trips open; both plot and graphs of FIGS. 7 and 8 useful in understanding the operation and methods of the load-off circuit.
Figure 8B:
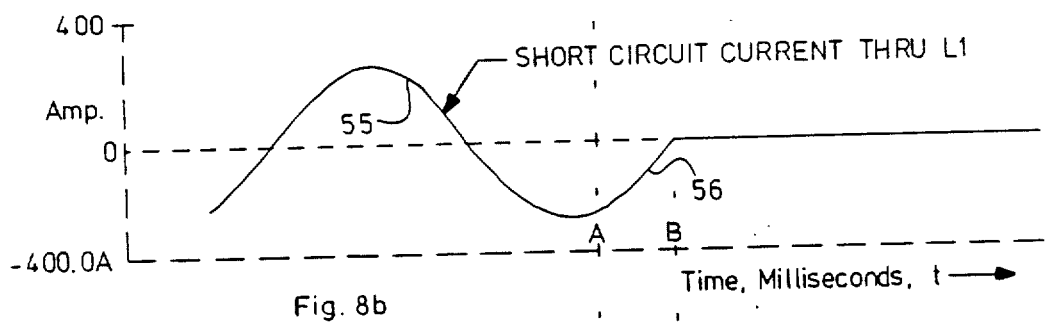
Figure 8C:
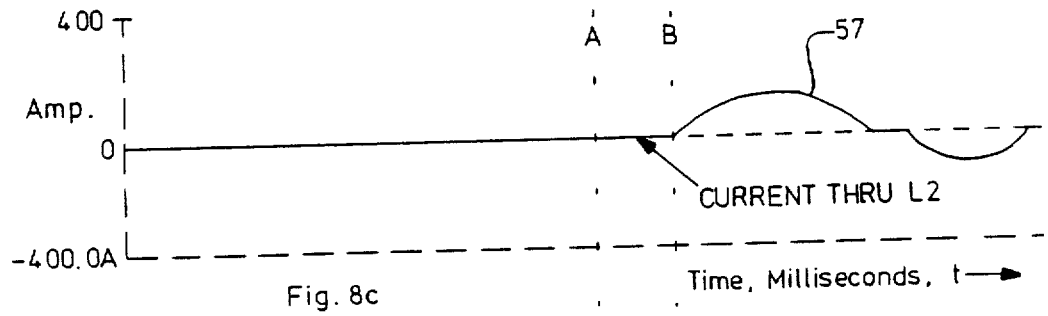
Figure 8D:
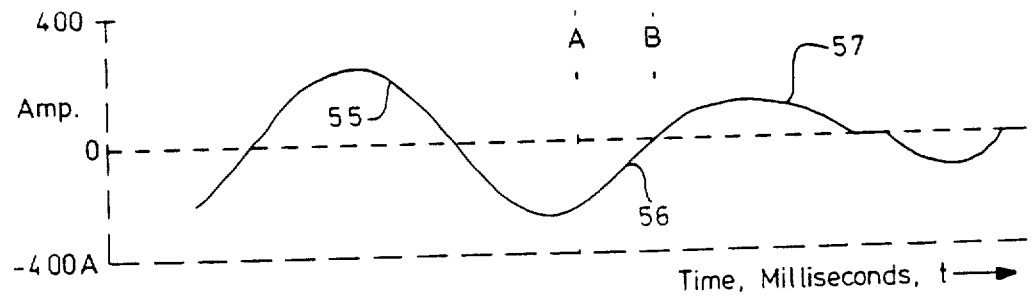

FIGS. 8a–8d illustrate further, the sequence, applying to the current plot of FIG. 7. The graphs of FIGS. 8a–8d do not match exactly the recorded plot of FIG. 7 and are not intended to do so, but only to help understanding of the load-off circuit improvement. In FIG. 8a, the fault current control signal 54 to the comparator amplifier 27 in control means 12, goes to zero volts at time A indicating the load circuit breaker opening or the fault clearing. In FIG. 8b, the short circuit current through inductor L1 at 55 continues until time A and then commutates off 56 to zero at time B. In FIG. 8c, there is no current flowing through inductor L2 (or the SCR bridge circuit 8) until time B, when the SCR's are switched full "ON". Current then flows through L2 as indicated by the waveform 57. FIG. 8d shows the composite of FIGS. 8b and 8c which corresponds in sequence to the plot of FIG. 7.

The plot of current flow in the high impedance circuit and load-off circuit of the present invention which is illustrated in FIG. 7, shows the effect of the second improvement control method described earlier. The fault current does not shut off and go to zero abruptly as it would in the conventional prior art current limiting devices, but rather decreases gradually in a "soft" turn-off until it goes to zero. This ensures that voltage transients imposed on the AC source bus by the sudden dropping of the load are minimized or decreased to insignificance.

From the foregoing description, it is apparent that the preferred embodiments and the control method improvements achieve the objects of the present invention. Alternative embodiments or various modifications of the embodiments depicted and the methods described, will be apparent from the above description to those skilled in the art. These and other alternatives are considered to be equivalent, and within the spirit and scope of the present invention.

Having described the invention, what is claimed is:

1. A method of controlling a polyphase AC current limiting circuit to produce in response to a load fault, a gradual rise in fault current at a rate typically less than 0.3 amperes per microsecond, so as to avoid the imposition of significant voltage transients on the AC electrical power bus; the method comprising:
    (a) connecting in each phase, a high impedance circuit which comprises two inverse-paralleled SCR's in series with an inductor L1, across a low impedance circuit which comprises two inverse-paralleled GTO thyristors;
    (b) detecting an overcurrent condition when load current rises sharply above a set pickup level;
    (c) switching to "OFF" said GTO thyristors in said low impedance circuit, immediately upon detection of said overcurrent condition;
    (d) switching to "ON", at the same time as Step (c), said SCR's in said high impedance circuit; said SCR's being initially set at a retarded firing angle in the range of 85 to 130 degrees;
    (e) changing the retarded firing angle of said SCR's in said high impedance circuit, to reach zero degrees over a preset period of time or number of cycles and to phase said SCR's full "ON"; and
    (f) limiting the fault current in said high impedance circuit to a value which is determined by selection of said inductor L1.

2. A method of controlling a polyphase AC current limiting circuit to achieve a soft turn-off when fault current is removed, by causing a current to continue to flow in said current limiting circuit immediately upon clearing of the fault, and then reducing the current in steps to zero so as to avoid the imposition of significant voltage transients on the AC electrical power bus; the method comprising:
    (a) connecting to each output phase, a first, second and third inductor, designated L2, said inductors being connected to branches of a three phase SCR bridge circuit;
    (b) detecting fault clearance when fault current is reduced sharply;
    (c) switching the SCR's to "ON" in said SCR bridge circuit immediately upon detection of said fault clearance; said SCR's being initially set at a retarded firing angle of zero degrees, allowing current to continue flowing through said L2 inductors and said SCR's at about 40 to 50 percent below the maximum fault current level; and
    (d) changing the retarded firing angle of said SCR's in said SCR bridge circuit to reach 180 degrees over a preset period of time or number of cycles, resulting in zero current flow.

3. A method of controlling a polyphase AC current limiting circuit to achieve a soft turn-off when fault current is removed, by causing a current to continue to flow in said current limiting circuit immediately upon clearing of the fault, and then reducing the current in steps to zero so as to avoid the imposition of significant voltage transients on the AC electrical power bus; the method comprising:
    (a) connecting to each output phase, a line connecting to a branch of a three phase SCR bridge circuit; there being a load resistor connected across said SCR bridge circuit;
    (b) detecting fault clearance when fault current is reduced sharply;
    (c) switching the SCR's "ON" in said SCR bridge circuit immediately upon detection of said fault clearance; said SCR's being initially set at a retarded firing angle of zero degrees, allowing current to continue flowing through said SCR's and said load resistor at about 40 to 50 percent below the maximum fault current level; and
    (d) changing the retarded firing angle of said SCR's in said SCR bridge circuit to reach 180 degrees over a preset period of time or number of cycles, resulting in zero current flow.

4. A method of protecting the dissipating elements in the high impedance circuit of a current limiting circuit from overheating due to continuing load fault current; the method comprising:
    (a) switching to "OFF" the SCR's in said high impedance circuit; and
    (b) if said SCR's do not switch "OFF" due to failure, then activating the shunt trip circuit of the branch circuit breaker, causing it to trip open, disconnecting power from said current limiting circuit and thereby from said dissipating elements.

5. An improved polyphase AC current limiting circuit for the purpose of limiting fault current drawn by a faulted branch load, said fault current amplitude capable of causing significant voltage transients on the AC power bus that supplies said branch load; said current limiting circuit comprising in combination:

(a) a low impedance power circuit in each phase, said low impedance power circuit comprising two Gate-Turn-Off (GTO) thyristors connected in inverse parallel, said GTO thyristors capable of being switched open in response to a gate control signal within a few microseconds at any electrical degree angle during an AC current cycle, and controlling the flow of current to the load;

(b) a high impedance power circuit in each phase, which is connected across said low impedance circuit, said high impedance power circuit for the purpose of providing a path for AC load fault current when said GTO thyristors in said low impedance power circuit are switched open; said high impedance power circuit comprising two Silicon Control Rectifier (SCR) thyristors connected in inverse parallel and in series with a first inductor, said inductor selected to let-through a preset maximum fault current; said SCR thyristors responsive to phase control signals from a control source;

(c) a current transformer connected in each input power phase line, said current transformer for the purpose of signalling the status of current flow to the control means;

(d) a three phase SCR bridge circuit, the branches of said SCR bridge circuit being connected in shunt with each output power phase line by shunt power lines; each said shunt power line including a second inductor connected in series; said second inductor selected to let-through a preset amplitude of current corresponding to approximately half the preset maximum fault current; the SCR thryistors in said SCR bridge circuit and said second inductors being for the purpose of providing continuing current flow and limiting the rate of change in current when fault current is removed, thereby limiting the voltage transient caused by fault clearing to an arbitrarily low value;

(e) a control means, for monitoring the rate of change in load current, providing a control signal to the gates of said GTO thyristors in said low impedance power circuits to turn said GTO's off when necessary; for providing when necessary a control signal to the gates of said SCR thyristors in said high impedance power circuit, providing phase control drive to operate said SCR's at a retarded firing angle of from 130 degrees to zero degrees over a preset period of time; for providing when necessary, a control signal to the SCR gates of said three phase SCR bridge circuit, providing phase control drive to operate said SCR bridge circuit at a retarded firing angle starting from zero degrees to 180 degrees over a preset period of time; and providing when necessary, a signal to energize an external shunt trip circuit of the external circuit breaker connecting said AC power bus to the input power lines of said AC current limiting circuit; said control means comprising logic and control circuits for performing the foregoing control functions; and (f) a logic power supply for providing regulated DC power for all said logic and control circuits in said control means.

6. The apparatus as defined in claim 5 wherein: said control means includes a load current monitoring circuit, an overcurrent detector, GTO thyristor drive logic and drive circuits, SCR thyristor drive logic and drive circuits, SCR bridge drive logic and drive circuits, and circuit breaker trip logic and trip-circuit; said load current monitoring circuit comprising three rectifier bridges, the branches of each said rectifier bridge being connected to said current transformers in each said input power phase line; said rectifier bridges being connected in series with each other, the total output current of said rectifier bridges always being the highest instantaneous current of any individual phase current transformer, and passed through a loading resistor which is connected across said three rectifier bridges, developing a voltage signal that is proportional to the maximum current in any one of the three phases; said over-current detector comprising a current reference circuit and a comparator-amplifier, said voltage signal across said loading resistor being coupled to said current reference circuit and input to said comparator-amplifier which compares said voltage signal with a reference from said current reference and outputs a current status signal High or Lo; said GTO thyristor drive logic having an input connected to said current status signal from said comparator-amplifier, and having a timing circuit that processes said current status signal, outputting a drive shut off signal to the GTO drive circuit if said current status signal is High and continues for approximately 25 microseconds, causing said GTO's in said low impedance power circuit to switch off; said SCR thyristor drive logic having an input connected to said current status signal from said comparator-amplifier, and outputting an "ON" signal to said SCR thyristor drive circuit if said current status signal is High; said SCR thyristor drive logic providing phase control drive to said SCR thyristors in said high impedance power circuit, varying said phase control retarded firing angle settings over a preset period of time; said SCR bridge drive logic having an input connected to said current status signal from said comparator-amplifier, and on receipt of a Lo signal following a High signal, outputting an "ON" signal to said SCR bridge drive circuit; said SCR bridge drive logic providing phase control drive to said SCR bridge thyristors, varying said phase control retarded firing angle settings over a period of time; said circuit breaker trip logic having an input connected to said current status signal from said comparator amplifier, said status signal, if High, starting a timing sequence in a timing circuit and after a predetermined time interval, outputting a signal that energizes said breaker trip circuit, commanding the circuit breaker to trip open.

7. The apparatus as defined in claim 5 wherein: said three phase SCR bridge circuit, as an alternate configuration, is connected directly in shunt with each output power phase line, without a second inductor connected in series; said SCR bridge circuit having connected across it a loading resistor that is selected to let through a preset amplitude of current corresponding to approximately half the preeset maximum fault current; the SCR thyristors in said SCR bridge circuit being responsive to control signals; said SCR bridge circuit and said loading resistor being for the purpose of providing continuing current flow and limiting the rate of change in current when fault current is removed, thereby limiting the voltage transient caused by fault clearing to an arbitrarily low value.

* * * * *

UNITED STATES PATENT AND TRADEMARK OFFICE
CERTIFICATE OF CORRECTION

PATENT NO. : 4,924,342

DATED : May 8, 1990

INVENTOR(S) : Robert H. Lee

It is certified that error appears in the above-identified patent and that said Letters Patent is hereby corrected as shown below:

In the Drawing

Delete Figs. 2, 3, 4A, 4B and 5 and substitute Figs. 2, 3, 4, 5, 6, 7, 8a, 8b, 8c and 8d. therefor.

The title page should be deleted to appear as per attached title page.

Signed and Sealed this

Seventh Day of July, 1992

Attest:

DOUGLAS B. COMER

Attesting Officer

Acting Commissioner of Patents and Trademarks

United States Patent [19]
Lee

[11] Patent Number: 4,924,342
[45] Date of Patent: May 8, 1990

[54] LOW VOLTAGE TRANSIENT CURRENT LIMITING CIRCUIT

[75] Inventor: Robert H. Lee, Fullerton, Calif.

[73] Assignee: Teledyne Inet, Torrance, Calif.

[21] Appl. No.: 228,829

[22] Filed: Aug. 3, 1988

Related U.S. Application Data

[63] Continuation-in-part of Ser. No. 6,798, Jan. 27, 1987, abandoned.

[51] Int. Cl.⁵ .................................. H02H 9/02
[52] U.S. Cl. ............................. 361/58; 361/42
[58] Field of Search ............... 361/20, 21, 22, 42–50, 361/58, 111, 114, 115, 117, 91, 87

[56] References Cited

U.S. PATENT DOCUMENTS

| | | | |
|---|---|---|---|
| 3,256,448 | 6/1966 | Ogawa et al. | 361/58 |
| 3,558,983 | 1/1971 | Steen | 361/58 |
| 3,611,031 | 10/1971 | Lutz | 361/58 X |
| 4,042,963 | 8/1977 | Kriechbaum | 361/20 |
| 4,122,507 | 10/1978 | Queen | 361/58 X |
| 4,158,864 | 6/1979 | Kennon | 361/58 |
| 4,184,186 | 1/1980 | Barkan | 361/58 X |
| 4,214,289 | 7/1980 | Otsuka et al. | 361/58 X |
| 4,236,186 | 11/1980 | Takagi | 361/58 X |
| 4,266,258 | 5/1981 | Eidinger et al. | 361/58 |

Primary Examiner—A. D. Pellinen
Assistant Examiner—A. Jonathan Wysocki
Attorney, Agent, or Firm—Monty Koslover Assoc.

[57] ABSTRACT

A polyphase AC current limiting circuit, which incorporates improvements in control methods and circuitry that operate to avoid high rates of current change which occur upon initiation of a branch load fault and when the branch load fault is suddenly cleared. This "soft" start and "soft" load-off characteristic, reduces the voltage transients imposed on the AC power source and bus to relative insignificance compared with the voltage transients imposed by prior art current limiting circuits. The invention AC current limiting circuit comprises a high impedance circuit connected in parallel with a low impedance circuit, a load-off circuit connected in shunt with the device output power lines, and a control means for controlling the switching devices. When a branch load fault is sensed, the control means turns off the switches in the low impedance circuit through which normal current flows, and turns on the switches in the high impedance circuit, starting phased back, so that the initial current step is typically 100 percent of rated load current. Within a few cycles, the switches are phased to full on and the maximum current is limited by an inductor in series with the switches in the high impedance circuit. When the load fault is suddenly cleared and current drops to zero, the load-off circuit is energized and current continues to flow at graduated lower levels until the circuit is switched off. In the event that the load fault does not clear, the switches in the high impedance circuit are turned off, stopping current flow and a trip signal is transmitted to trip open an external input circuit breaker.

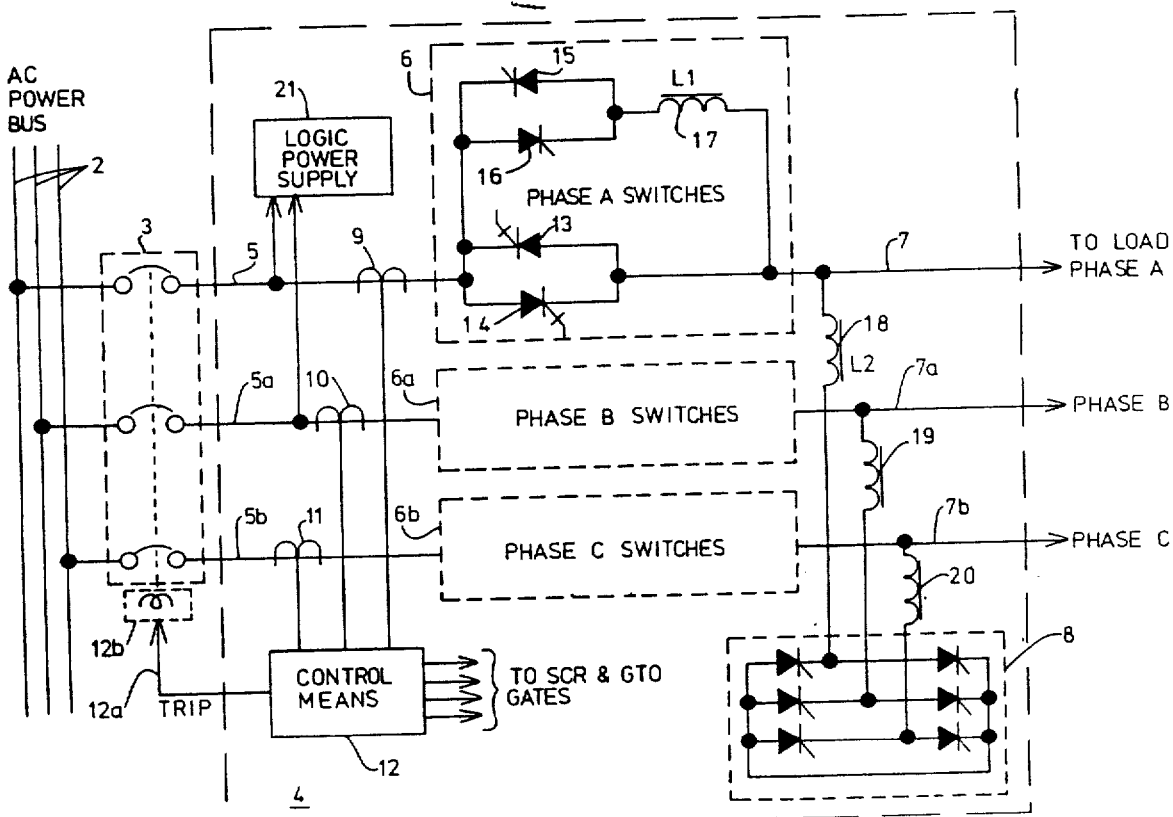

7 Claims, 8 Drawing Sheets